United States Patent [19]

DeSimone et al.

[11] Patent Number: 4,997,672
[45] Date of Patent: Mar. 5, 1991

[54] SALT TASTE ENHANCER

[75] Inventors: John A. DeSimone; Gerard L. Heck, both of Richmond, Va.

[73] Assignee: Virginia Commonwealth University, Richmond, Va.

[21] Appl. No.: 556,867

[22] Filed: Jul. 25, 1990

Related U.S. Application Data

[63] Continuation of Ser. No. 241,270, Sep. 7, 1988, abandoned, continuation-in-part of Ser. No. 157,083, Feb. 8, 1988, abandoned, continuation-in-part of Ser. No. 24,170, Mar. 10, 1987, abandoned.

[51] Int. Cl.$^5$ .............................................. A23L 1/237
[52] U.S. Cl. ...................................... 426/649; 426/537
[58] Field of Search ................................ 426/649, 537

[56] References Cited

U.S. PATENT DOCUMENTS 2,539,012  1/1951  Diamond ........................ 426/649 X Primary Examiner—Joseph Golian
Attorney, Agent, or Firm—Staas & Halsey

[57] ABSTRACT

This invention relates to processes and compositions found useful for potentiating the taste of sodium chloride in humans. It has been found that the taste of sodium chloride can be enhanced in the human mouth by combining therewith, or with foods or beverages containing same, small quantities of cationic surfactants comprised of certain quaternary ammonium salts. A preferred sodium chloride taste enhancing surfactant is cetyl pyridinium chloride.

11 Claims, 4 Drawing Sheets

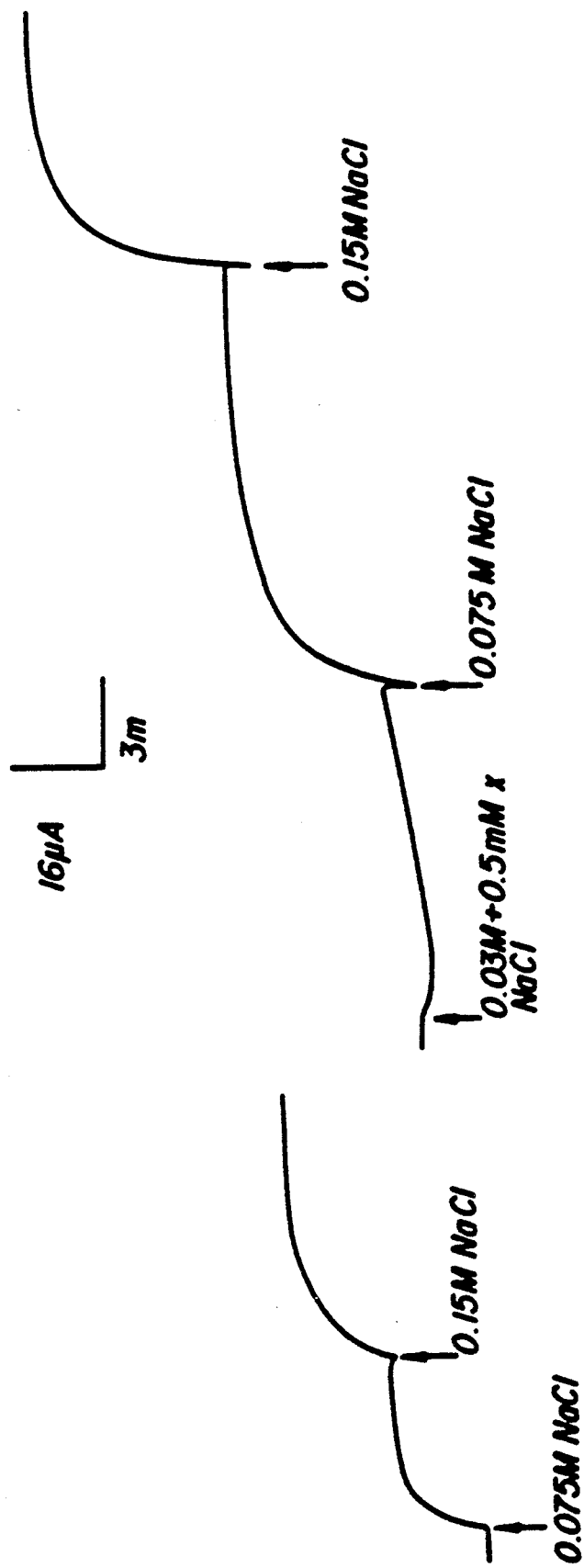

SALT TASTE ENHANCER

This is a continuation of copending application Ser. No. 241,270 filed on Sept. 7, 1988 and now abandoned, which in turn was a continuation-in-part of application Ser. No. 157,083 filed Feb. 8, 1988 and now abandoned, which in turn was a continuation-in-part of application Ser. No. 024,170 filed Mar. 10, 1987, now abandoned.

BACKGROUND OF THE INVENTION

1. Field of the Invention

This invention relates to cationic surfactants which are useful for enhancing or potentiating the taste of sodium chloride and other salty tasting compounds by humans.

2. The Prior Art Environment

Sodium chloride, ordinary table salt, is an important component in many of the physiological processes of the human body. The chemical also imparts a more palatable taste to foods, and in fact, many foods are considered to be tasteless in the absence of salt. Unfortunately, it is also well known that there are diseases of the human body where the intake of salt in even ordinary amounts can adversely affect the control of the disease. In such instances, the intake of sodium chloride must be regulated. Hypertension and diabetes are examples of diseases where the regulation of sodium chloride intake is essential. Individuals who must regulate their salt intake are presented with the difficult problem of flavoring their foods so as to make the same palatable at low salt levels.

One of the methods available for regulating the intake of sodium chloride, is to substitute potassium chloride for ordinary table salt. But potassium chloride and most other substitutes for sodium chloride are inadequate in that the taste of the substitute is generally perceived as being different from table salt. And frequently bitter aftertastes are experienced. Accordingly, a satisfactory substitute for sodium chloride is highly desirable.

Another approach to the regulation of sodium chloride intake is to consume amounts that can be tolerated without injury to an individual's health. Investigators have been well aware that if the taste of low sodium chloride levels could somehow be enhanced or potentiated, the related problems of regulation of sodium chloride intake and maintenance of food palatability would be solved or at least minimized. However, only recently have significant advances been made in understanding the physiology of salt taste perception, an area that is vital to the investigation of salt taste enhancement. Research conducted by the present inventors, in cooperation with others, in an effort to elucidate the physiology of taste perception, has resulted in a breakthrough by establishing (1) the existence of lingual sodium channels across the lingual tissue and (2) the movement of sodium ions through such channels and across the lingual tissue as an electrical current, a discovery that was contra-indicated by previously prevailing theory. This discovery was reported in *Science*, Vol. 214, pp. 1039–41, Nov. 27, 1981, which reference is incorporated herein in its entirety. Subsequently, investigations by the inventors has correlated their breakthrough discovery with taste nerve response, and such correlation has been independently verified by other investigators in the field. See Soeda et al., *Japanese Journal of Physiology*, 35, 1101–1105, 1981; S. A. Simon & J. L. Gavin, "Salt & Acid Studies on Canine Lingual Epithelium", 398–408, *American, Physiological Society*, 1985.

In applying these discoveries to salt taste enhancement and/or potentiation, workers in the field have been searching for satisfactory compounds to increase sodium transport across lingual epithelium as a mechanism for potentiating the taste of sodium chloride. Schiffman et al. reported in their article, "Bretylium Tosylate Enhances Salt Taste", *Physiology & Behavior*, Vol. 36, 1129–1137 (1986) that bretylium tosylate enhances salt taste in humans and rats as statistically determined in human taste tests and as measured from electrophysiological taste responses in rats. However, bretylium tosylate has no effect on the short circuit current in isolated dog lingual epithelium, apparently acting through other physiological pathways. Bretylium tosylate is (obromobenzyl) ethyldimethylammonium p-toluenesulfonate, an ethical drug dispensed for the treatment of serious coronary heart disease. It is an adrenergic blocking agent which exhibits toxic side effects. As a result, the drug is of doubtful use as a salt taste enhancer.

Tada et al., *J. Agric Food Chem.*, 32, 992–996 (1984) have reported on a group of polypeptides that exhibit a salty taste. It has been found that these compounds also exhibit a bitter taste component, and while they may possibly be used alone as salt substitutes, they have not been shown to potentiate or enhance salt taste.

Other problems faced by investigators in the development of salt taste potentiators include the requirement that the compound must be essentially non-reactive on the tongue except for the activity shown in taste enhancement; the compound must be chemically stable; it must be relatively non-toxic; it must be physically and chemically compatible with foods and beverages; and it must be economical.

OBJECTS OF THE INVENTION

It is an object of this invention to provide a process for the potentiation in humans of the taste of sodium chloride so that the intake of sodium chloride may be regulated.

It is a further object of this invention to provide a process for the potentiation in humans of the taste of sodium chloride utilizing compounds or mixtures that are of low toxicity and safe for human consumption.

Yet a further object of this invention is to provide compositions and processes for potentiating the taste of sodium chloride by humans utilizing compounds, mixtures and methods that are compatible with ordinary foods and beverages and whose usefulness will not significantly deteriorate with time upon storage in admixture with such foods and beverages. Thus, it is also an object of the invention to provide time proven foods and beverages having reduced sodium chloride content and conventional salty tastes for humans.

A further object of this invention is to provide a means for reducing sodium chloride content in consumable material that is economical, employing compounds or mixtures whose cost will not substantially affect the cost of the foods and beverages in which they are employed.

Another object of this invention is to provide a means for the enhancement of the taste by humans of sodium chloride employing compounds and mixtures that produce no secondary tastes which can be perceived by a human or that leave an after-taste other than that associated with the taste of sodium chloride.

Yet another object of the invention is the provision of a shakable or similarly dispersible particulate mixture that has a reduced sodium chloride content and yet provides a satisfying salty taste to food materials to which it is applied.

SUMMARY OF THE INVENTION

It has now been discovered that the taste of sodium chloride in foods or beverages containing less than a normal amount of sodium chloride can be potentiated and/or enhanced by simply adding to such foods or beverages a sodium chloride salt taste potentiating amount of a cationic surfactant having the structure $$[Q]_m^+ \ [X]_n^- \cdot YH2O$$

wherein Q is selected from the group comprising

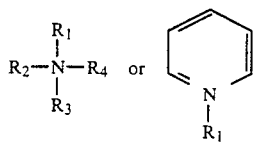

and wherein N is nitrogen; $R_1$ is an aliphatic group comprising a sufficient number of carbon atoms to cause the compound to possess surface active characteristics; $R_2$, $R_3$ and $R_4$ are alkyl, aryl, aralkyl or alkoxyalkyl substituents of up to about 24 carbon atoms, which substituents are alike or different, or where at least two of the same collectively form an aliphatic heterocyclic ring with the quaternary nitrogen; X is a mono or polyvalent anion of an acid; m is an integer equal to the valence of the anion X; n is an integer equal to the valence of the cation Q; and Y is 0 or an integer of from 1 to 12.

In another aspect of the invention, a composition enhanced in salt taste is provided comprising sodium chloride or a food or beverage containing the same in admixture with a sodium chloride taste potentiating amount of the cationic surfactant described above.

DETAILED DESCRIPTION OF THE INVENTION $R_1$ in the structure of the cationic surfactant of the invention may comprise an aliphatic group which includes as few as eleven or twelve carbon atoms, the main criteria in this connection simply being that the resultant compound must be surface active. On the other hand, $R_1$ may comprise up to as many as 24 or more carbon atoms. Thus, $R_1$ might be, for example, a cetyl, lauryl, octadecyl, myristyl or like group.

$R_2$, $R_3$ and $R_4$ might each comprise a group such as methyl, ethyl, propyl, butyl, pentyl, hexyl, octyl and their isomers, phenyl, tolyl, benzyl, anisyl, 2-phenylethyl, ethoxyethyl, methoxyethyl, cetyl, lauryl, octadecyl, myristyl, and the like. Additionally, two or more of $R_2$, $R_3$ and $R_4$ might be interconnected to form a heterocyclic ring with the quaternary nitrogen atom. Examples of heterocyclic rings formed when two or more of $R_2$, $R_3$ and $R_4$ are taken together with the quaternary N atom are piperidinium, morpholinium and octahydroindolizinium groups.

The anion X of the cationic surfactant of the invention might be an anion of either a strong or a weak acid. Illustrations of suitable anions are chloride, bromide, fluoride, iodide, sulfate, nitrate, perchlorate, phosphate, trichloroacetate, paratoluene sulfonate, and salicylate.

Thus, the cationic surfactants of the invention include, for example, cetylpyridinium chloride, cetylpyridinium sulfate, cetylpyridinium nitrate, cetylpyridinium paratoluene sulfate, laurylpyridinium chloride, laurylpyridinium sulfate, laurylpyridinium trichloroacetate, octadecylpyridinium chloride, octadecylpyridinium bromide, octadecylpyridinium sulfate, myristylpyridinium chloride, myristylpyridinium sulfate, myristylpyridinium nitrate, methylcetylpiperidinium chloride, ethylcetylpiperidinium chloride, hexyllaurylpiperidinium sulfate, butylmyristylpiperidinium chloride, cetyllaurylpiperidinium chloride, methylcetylmorpholinium chloride, ethyllaurylmorpholinium chloride, benzylcetylmorpholinium bromide, ethyllaurylmorpholinium chloride, cetyloctahydroindolizinium chloride, cetyltrimethylammonium chloride, phenylcetyldimethylammonium chloride, 2-phenylethylcetyldimethylammonium chloride, lauryltrimethylammonium chloride, laurylcetylmyristylmethylammonium chloride.

The preferred cationic surfactant for use in accordance with the present invention is cetylpyridinium chloride, referred to hereinbelow as cpc. Cpc is known to be a non-toxic, stable chemical compound that is economical and readily compatible with foods and beverages.

The cationic surfactants employed in accordance with the present invention are prepared by methods well known in the art. In general, the methods are those commonly used for the preparation of quaternary ammonium compounds wherein a tertiary amine is contacted with an alkyl halide to produce the corresponding quaternary halide. For instance, cetylpyridinium chloride may be prepared by the following reaction.

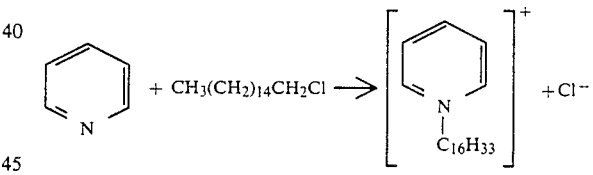

Methods using aqueous reaction medium typically result in compounds containing one or more molecules of water of hydration.

The cationic surfactants of the invention may be used singly or in combination to enhance salt taste perception. The concentration of the cationic surfactant useful for enhancing salt taste in a liquid or semi-solid food product will vary depending principally upon the particular cationic surfactant employed. In general, the cationic surfactants of the invention may be used at very low concentrations; that is at concentrations that are less than the critical micelle concentration (cmc) of the surfactant. Frequently this may be a concentration of 0.1 millimolar (mM) or even less. The upper limit to the amount or concentration of the surfactant depends primarily on the desirability for avoiding the development of an off taste in the foodstuff which may be associated with the surfactant at very high concentrations. In general practice, the surfactants would ordinarily not be used at such high concentrations. Toxicity considerations should generally not limit the quantity of cpc which might be employed in a particular foodstuff preparation. The cationic surfactants may be added as a mixture with sodium chloride or separately to a previously salted foodstuff. The invention also contemplates the provision of a shakable or otherwise dispersible granular mixture of sodium chloride and a cationic surfactant, for example.

When cpc is used as a salt taste potentiator, the concentration thereof in solution may be as about high as 50 to 60 $\mu$M. Concentrations above 60 $\mu$M begin to cause averse reactions (oral irritation, bitterness). Concentrations below about 50 $\mu$M are simply less effective. Cationic surfactants as a class may generally be useful at concentrations below their respective cmc, because at and above the cmc surfactants become good detergents and as such the same may be cytotoxic and thus very irritating. Accordingly, the cmc is often the upper practical limit on the usable concentration. However, in the case of cpc, undesirable effects are noted just above about 60 $\mu$M, a concentration that is slightly below the cmc of cpc which is 100 $\mu$M. The effective concentration range for cpc is thus about 5 to about 60 $\mu$M, with the range of about 50 $\mu$M to about 60 $\mu$M being optimal for providing maximum desired effects and minimum undesired effects.

The usefulness of the cationic surfactants of the invention as enhancers of salt taste was discovered only after a protracted scientific investigation into the physiological events involved in salt taste perception in humans plus the development of scientific techniques to quantify the physiological events associated with such salt taste perception and correlation of those events with human salt taste response. In one aspect of the investigation, active ion transport across the canine lingual epithelium was studied using short circuit current ($I_{sc}$) to investigate the type of chemical structures that enhance sodium ion transport. Workers in the field have shown that increased current through sodium specific channels in the membrane of the tongue mucosa is an important event in salt taste transduction. $I_{sc}$ measurement is a method used by investigators in this field to assess an increase in current through sodium specific channels. The method is known to correlate well with human salt taste perception. The method can be used to distinguish compounds that are known through other techniques to block sodium ion transport through the epithelium as well as respond in a quantitative way to experiments in sodium ion transport enhancement.

Using the $I_{sc}$ method, cpc, when applied to the mucosa side of canine lingual epithelium, increases the $I_{sc}$ several fold over baseline current. In addition, the effect is dose dependent. The enhancement is achieved at surprisingly low concentrations of cpc, ranging from 0.1 mM to 1 mM. Equally surprising, it has been found that cpc not only increases the $I_{sc}$, but also increases the sodium chloride current in post-treated tissues relative to pretreated tissues.

The increases in $I_{sc}$ found through application of small concentrations of cpc, i.e., tenths mM, is unprecedented in the field. With cpc, the $I_{sc}$ has been shown to increase 280%.

The fact that the increased $I_{sc}$ across canine lingual epithelium in the presence of cpc correlates with enhanced salt taste in humans was confirmed by taste tests described below.

Although it is not known for certain, it is believed that the long hydrocarbon chain represented by the $R_1$ group of the cationic surfactants of the invention increases the solubility and membrane compatibility of the charged cations [Q+] within the sodium transport lingual channels, thereby increasing $I_{sc}$ and enhancing salt taste perception.

In light of the fact that the compounds of the present invention enhance salt taste perception in humans, it follows that such compounds can be employed in combination with a salt such as sodium chloride or a salty-tasting substance such as arginine hydrochloride, in order to produce the perception of a taste that is saltier than the taste that would have been perceived through the use of a salt or salty-tasting substance alone. This is useful because the perceived salt taste can be quantified by measuring the $I_{sc}$ for a given quantity of salt. On the other hand, the perceived salt taste may be quantified by measuring the neural response to the material, as is demonstrated in Example 3. Then, a reduced amount of salt, or of a salty-tasting substance, or of a mixture thereof, may be combined with one or more of the surfactant compounds of the present invention to produce the same $I_{sc}$ or neural response as the original, higher quantity of salt and therefore, produce the same perceived salt taste as that of the original higher quantity of salt. In this manner, the salt content of foods and beverages may be reduced by enhancing the perceived salt taste of a reduced quantity of salt using one or more of the surfactant compounds of the present invention to thereby produce the same perceived salt taste as would have been perceived had the original, higher quantity of salt been employed.

The salt taste enhancing compounds of the present invention may be employed to enhance the perceived salt taste of any salts used in food or beverage products. The preferred salt taste to be enhanced by the compounds of the present invention is that of sodium chloride, primarily because of the recent discovery that ingestion of large amounts of sodium may have adverse effects on humans and the resultant desirability of reducing salt content while retaining salt taste.

In addition, the compounds of the present invention may also be employed to enhance the perceived salt taste of known salty tasting compounds which may be used as salt substitutes. Such compounds include cationic amino acids and low molecular weight dipeptides. Specific examples of these compounds are arginine hydrochloride, lysine hydrochloride and lysine-ornithine hydrochloride. These compounds exhibit a salty taste but are typically useful only at low concentrations since they exhibit a bitter flavor at higher concentrations. Ordinarily, these salty-tasting compounds will be used in concentrations ranging from about 1 to about 40 mM, and preferably from about 10 to about 30 mM. Thus, it is feasible to reduce the sodium chloride content of a food or beverage product by first formulating a food or beverage with less sodium chloride than is necessary to achieve a desired salt taste and then adding to said food or beverage the compounds of the present invention in an amount sufficient to potentiate the salt taste of said salted food or beverage to reach said desired taste. In addition, the sodium chloride content may be further reduced by substituting a salty-tasting cationic amino acid, a low molecular weight dipeptide or mixtures thereof for at least a portion of the salt.

The following example is provided to illustrate the $I_{sc}$ test procedure used in the evaluating cpc as a salt taste enhancer. The procedure will be described with reference to the drawings wherein:

FIG. 3 is a graphical representation of increasing $I_{sc}$ in the presence of sodium chloride and cpc.

EXAMPLE I

Figure 1:
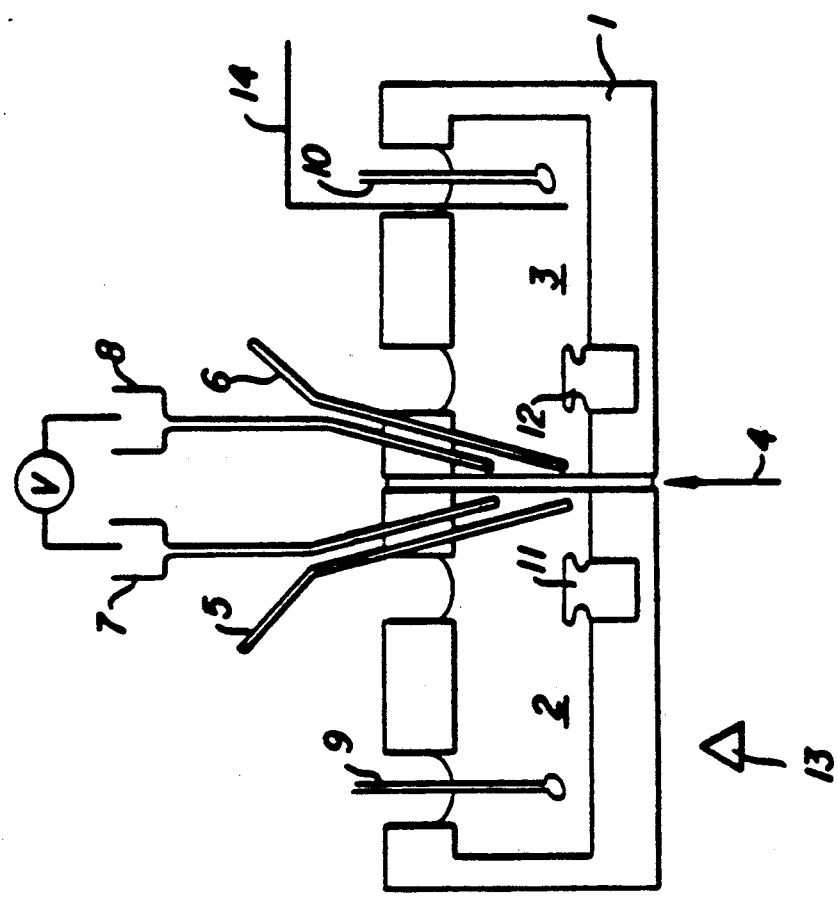
FIG. 1 is a side view of a Ussing chamber.

The detection of lingual epithelium $I_{sc}$ is conducted in a Ussing chamber. Referring to FIG. 1, the Ussing chamber consists of a Lucite block 1 partitioned into two chambers 2 and 3 by a tissue sample 4. Each chamber is filled with a buffer and oxygenated through tubes 5 and 6. The electrical potential difference across the tissue is monitored constantly using symmetrical calomel electrodes 7 and 8. Current passing electrodes 9 and 10 make contact with the buffer solutions. Stirrers 11 and 12, in cooperation with the heat source 13 and temperature sensor 14, maintain the chamber at constant temperature. The test tissue is the dorsal (top) epithelium of the tongue of a freshly killed dog mounted as a partition between the chambers with buffer solution bathing the mucosa or surface of the tongue. Additionally, buffer solution is separately in contact with the serosa side or interior surface of the tongue section. The tissue is bathed on both sides with the buffer solution and the same is constantly gassed with 95% oxygen and 5% carbon dioxide at a pH equaling 7.4. The electrical difference across the lingual epithelium is monitored constantly using symmetrical calomel electrodes which make contact with the buffer via 0.15 molar (M) sodium chloride/agar salt bridges. The system is also fitted with Ag/Agcl current passing electrodes which make contact with the bathing solutions across the lingual epithelium also via salt bridges. In each case the system is allowed to develop a transepithelial electrical potential. After a steady state potential is achieved, the tissue is short circuited the short circuit is continuously monitored on a strip chart recorder. To obtain the current response as a function of cpc concentration, the mucosa or oral cavity side solution is replaced by a solution of buffer containing a concentration of cpc. The time course of the change is followed and the system is allowed to achieve a new steady state.

Figure 2:
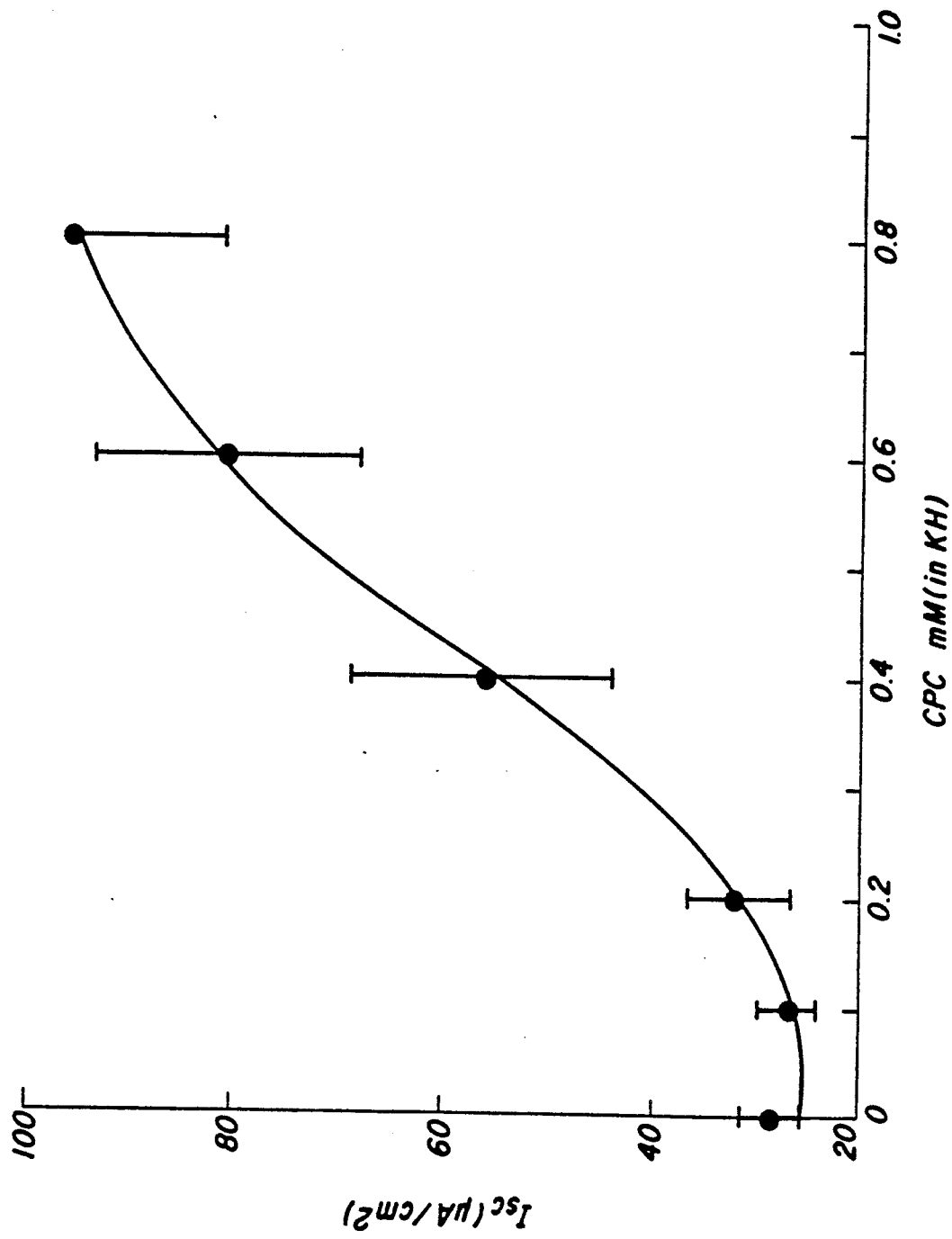
FIG. 2 is a graphical representation of the effect of cpc on $I_{sc}$.

FIG. 2 is a dose response relationship for cpc in the buffer solution. Readily measurable increases in $I_{sc}$ occur with cpc concentrations of between about 0.1 mM and about 1 mM in the buffer solution. The curve is sigmoidal, suggesting positive cooperativity in the activation of the current. In this case, the shape suggests that cpc must cross a diffusion barrier before it reaches its place of action. The shape supports the conclusion that a minimum concentration of cpc must be present at the place of action before a significant increase in current can occur. Because the tissues are short circuited and are between identical reservoirs, except for the low concentration of cpc, the increase in current must ultimately be viewed as increased active current, i.e., metabolically linked current. The actual $I_{sc}$ increased by approximately 280% in the presence of cpc. Table 1 further illustrates the results of the experiment showing increases in $I_{sc}$ due to cpc.

TABLE I

| cpc Concentration (mM) | Response ($\mu A/cm^2$) (Means for four experiments) | Percent Increase |
| --- | --- | --- |
| 0.0 | 28.4 | |

TABLE I-continued

| cpc Concentration (mM) | Response ($\mu A/cm^2$) (Means for four experiments) | Percent Increase |
| --- | --- | --- |
| 0.1 | 27.1 | −4.80% |
| 0.2 | 31.9 | 12.32% |
| 0.4 | 56.6 | 99.30% |
| 0.6 | 80.9 | 184.86% |
| 0.8 | 96.1 | 238.38% |
| 1.0 | 89.4 | 214.79% |

The effect of cpc on the $I_{sc}$ at various concentrations of sodium chloride is presented in FIG. 3 and in tabular form in Table II.

TABLE II

Effect of 0.5 mM cpc treatment on salt response

| NaCl Conc. | Before | After | % Increase |
| --- | --- | --- | --- |
| 0.075M | 14.5 | 16.3 $\mu A/cm^2$ | 12.41 |
| 0.15M | 24.0 | 32.1 | 33.75 |
| 0.5M | 124.3 | 248.6 | 100.00 |

These studies show that cpc causes the current to increase in response to increasing sodium chloride concentrations to a greater extent than in the controls. In FIG. 3, control responses to 0.075 M sodium chloride and 0.15 M sodium chloride were obtained from a base line of 0.03 M sodium chloride. After returning to the base line in the 0.03 M sodium chloride solution the solution was changed to a 0.03 M sodium chloride solution containing 0.5 mM of cpc. The result is a slowly rising base line. When retested with 0.075 M sodium chloride and 0.15 M sodium chloride solutions, the current responses were significantly increased over the controls. This effect is considerably greater at hyperosmotic sodium chloride concentrations. In Table II these same results are presented and show that, for example, before and after treatment with 0.5 mM cpc the current in 0.5 M sodium chloride increases from 124.3 $\mu A/cm^2$ to 248.6 $\mu A/cm^2$, a percentage increase of 100%.

Based on the experience in the field in the correlation between $I_{sc}$ and the neural, or taste nerve response to sodium chloride, the measure of the $I_{sc}$ and its increase in the presence of cpc is found to be a firm index for enhanced salt taste perception. The following example supports this conclusion.

EXAMPLE II

The following is a protocol suitable for demonstrating the salt taste enhancing character of cpc in humans.

1. Make up a 0.15 M NaCl solution.
2. Dissolve 2 mg of cpc in 100 ml of distilled water. (This gives a concentration of $5.9 \times 10^{-5}$ M.)
3. Rinse mouth out with 10 ml of distilled water for 10 sec. Spit out water.
4. Rinse whole mouth out with 10 ml of 0.15 M NaCl solution for 10 sec. Note degree of saltiness and the rate of adaptation of the taste. Spit out solution.
5. Rinse whole mouth out with 10 ml of cpc solution for 10 sec. Cover the entire oral cavity including front and back of tongue. Spit out solution.
6. Rinse whole mouth out with 10 ml of 0.15 M NaCl solution for 10 sec. Note again the degree of saltiness and the rate of adaptation. Spit out solution. Note persistence of the saltiness even after the NaCl is expectorated. This prolongation of the salty experience often carries over to the next trial. In other words the saltiness adapts more slowly following cpc.
7. Repeat series several times.

It is found that the NaCl tastes saltier after the mouth is rinsed with cpc and that the saltiness adapts more slowly.

EXAMPLE III

In an attempt to find a neurophysiological model for the salt taste enhancing capacity of cpc, recordings having been made directly from the taste nerves of rats. Using conventional surgical methods the chorda tympany nerve, which innervates the anterior two-thirds of the tongue, was exposed and standard electrophysiological techniques were used to record the neural activities when sodium chloride was flowed over the tongue through a flow chamber affixed to the tongue surface. The responses to the sodium chloride stimulus were compared before and after treating the rat tongue with solutions of cpc at several concentrations. In general the effect of cpc was to increase the response of the taste nerves to a sodium chloride stimulus. Following cpc treatment the neural response to sodium chloride did not adapt as fast as the pretreatment controls. This is entirely consistent with the experience of human subjects wherein the sensation of "saltiness" appears more persistent following cpc than in the control case (cf Example II).

Figure 4A:
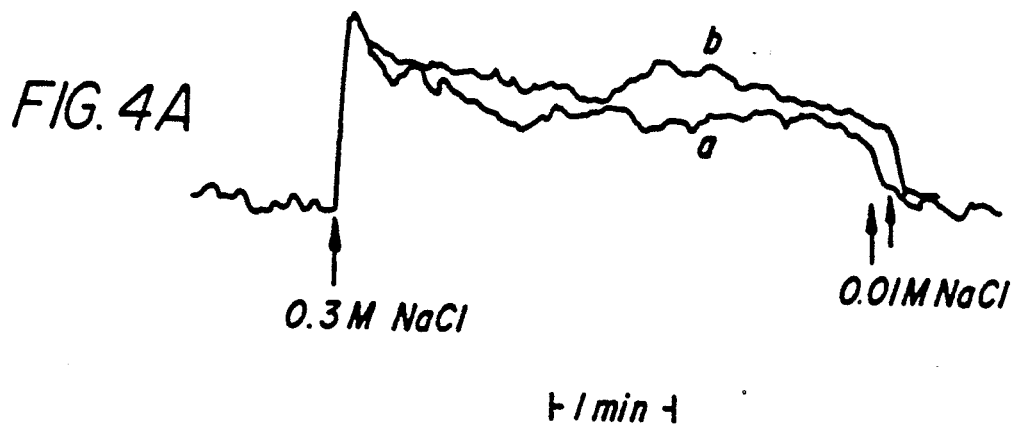
FIGS. 4A, 4B and 4C show the results of neural recordings from the taste nerves of rats before and after treatment with cpc, as described in Example III.
Figure 4B:
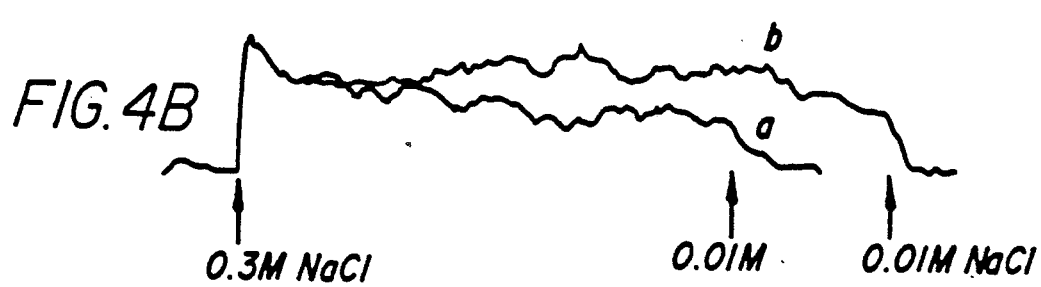
Figure 4C:
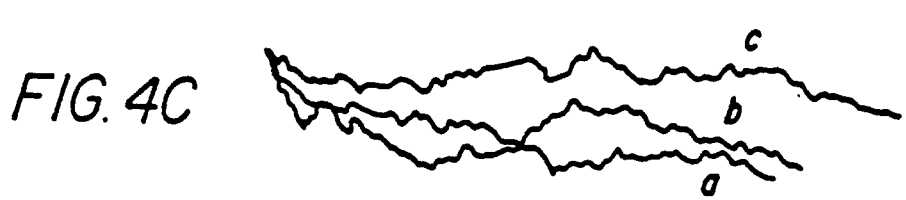

The results of the neural recording are shown in FIG. 4. FIG. 4A shows the integrated neural record in two cases (a and b). In each case the tongue was first adapted to 0.01 M NaCl. At the arrow on the left the adapting solution was displaced by 0.3 M NaCl. Case a shows the control response. This is a classical rapid increase in neural activity followed by a slow decrease in neural activity or adaptation. Case b shows the response to the same NaCl stimulus following $5.9 \times 10^{-5}$ M cpc for 5 min. Note that adaptation is significantly slower, i.e. the neural response to NaCl remains higher than the control. The percent increase in neural activity following cpc is about 33%. FIG. 4B shows a similar experiment using $2.5 \times 10^{-4}$ M cpc. Again curve a is the control and curve b the response following cpc treatment. In this case the response following cpc treatment increased about 45%. FIG. 4C compares the rate of adaptation in the neural response to 0.3 M NaCl for three concentrations of cpc. Curve a corresponds to O cpc, curve b to $5.9 \times 10^{-5}$ M cpc, and curve c to $2.5 \times 10^{-4}$ cpc. The rate of adaptation is either slowed or reversed by cpc.

Thus, as shown in Examples I, II and III, the salt taste enhancing ability of cpc is documented as: (1) an increased salt-evoked current across the canine lingual epithelium in vitro, (2) increased human perception of saltiness, and (3) increased activity in the taste nerves of the rat in vivo.

The following examples illustrate the use of the principles and concepts of the invention in connection with ingestible materials.

EXAMPLE IV

Two cans of Campbell's low sodium tomato soup were opened and sufficient sodium chloride was added to produce a 50 mM sodium chloride concentration in the contents. Sufficient cpc was added to the contents of one can to produce a 60 µM cpc concentration in the soup. The resultant soups were tasted by a panel of scientists and the soup containing the cpc was found to have a stronger perceived salt taste which was equivalent to tomato soup having a 75–80 mM concentration of sodium chloride without cpc. From this it was concluded that a soup having a 75–80 mM concentration of sodium chloride may be replaced by a soup having a 50 mM concentration of sodium chloride in combination with a 60 µM concentration of cpc. Thus the sodium chloride content of the tomato soup may be reduced without adversely affecting the salty taste.

EXAMPLE V

A 20 mM solution of arginine hydrochloride was prepared and tasted. It was found to be slightly salty. Then, sufficient cpc was added to the arginine hydrochloride solution to produce a 50 µM solution of cpc. The solution was tasted again and found to have a saltier taste than the original 20 mM solution of arginine hydrochloride.

EXAMPLE VI

A large pot of homemade chicken broth was prepared to have a 50 mM sodium chloride concentration. The soup was divided into two portions. One portion was left as is. Sufficient arginine hydrochloride was added to the second portion to produce a 20 mM arginine hydrochloride solution. Also added to the second portion was sufficient cpc to produce a 50 µM solution of cpc. Both portions were tasted by a panel of scientists and the second portion was markedly saltier and tasted as salty as homemade chicken broth having a 100–150 mM sodium chloride concentration. From this it was concluded that the sodium chloride concentration can be further reduced by substituting arginine hydrochloride for a portion of the sodium chloride and employing a compound of the present invention to enhance the salty taste of the sodium chloride/arginine hydrochloride combination.

EXAMPLE VII

A can (298 grams) of Campbell's low sodium tomato soup was divided into three 100 ml aliquot portions. Sufficient arginine hydrochloride was added to one portion to make a 70 mM solution. The same quantity of arginine hydrochloride was added to a second portion along with sufficient cpc to produce a 50 mM solution. The remaining portion served as a control. The solutions were heated to serving temperature and tasted by three subjects. Each subject described the control as bland. The arginine hydrochloride portion had a stronger, fuller taste, but could not be described as saltier. The arginine hydrochloride plus cpc portion had the strongest taste and was described as being the most palatable, but not by virtue of its being particularly salty. Increasing the arginine hydrochloride concentration from 70 mM to 140 mM increased the taste quality further. Again the arginine hydrochloride plus cpc portion was the most palatable. The concentration of sodium chloride in each portion was now brought up to 50 mM with the following effect: The control portion (now containing 50 mM NaCl) was described as being minimally salty but less than satisfactory. The portion containing 50 mM NaCl plus 140 mM arginine hydrochloride had a better salty flavor. The portion containing 50 mM NaCl, 140 mM arginine hydrochloride and 50 mM cpc was very salty tasting and was compared favorably in saltiness with regular tomato soups by each taster.

EXAMPLE VIII

Instant mashed potatoes (Town House brand) were prepared by placing one cup of potato flakes into two cups of boiling water and stirring until the usual consistency of mashed potatoes was achieved. Six fifty gram aliquot portions were prepared and seasoned as follows:

| Portion | NaCl (gms) | cpc (mgms) |
|---------|------------|------------|
| 1 | 0.0293 | 0.9 |
| 2 | 0.0585 | 0.9 |
| 3 | 0.0877 | 0.9 |
| 4 | 0.1170 | 0.9 |
| 5 | 0.1463 | 0.9 |
| 6 | 0.1463 | 0 |

The amounts of NaCl were chosen to correspond to the amounts that would produce, in 50 grams of solution, NaCl molarities of 10 mM, 20 mM, 30 mM, 40 mM, and 50 mM respectively. The amount of cpc was chosen to correspond to a 50 $\mu$M solution. A panel of tasters tasted portion 6 as a control. It was judged as pleasantly salty. The tasters then sampled portions 1 through 5. Portions 1, 2 and 3 were found to be less salty than the control (portion 6). Portions 4 and 5 were found to be saltier than the control. The point of equal salty taste was estimated to lie between portions 3 and 4. Thus, a mixture of about 0.1 gram of NaCl and 0.9 milligram of cpc added to 50 grams of instant mashed potatoes was found to provide a salty taste that was equivalent to the salty taste provided when 0.1463 gram of NaCl is added to 50 grams of mashed potatoes. This is about a 32% reduction in NaCl.

EXAMPLE IX

In order to reduce the NaCl content in a shakable salty mixture, a ternary mixture of L-arginine hydrochloride (Arg.HCl), NaCl, and cpc was found to be satisfactory. The following mixtures were prepared:

| Mixture No. | Arg.HCl (gm) | NaCl (gm) | cpc (mgm) |
|---|---|---|---|
| 1 | 0.8 | 0.2 | 5 |
| 2 | 0.6 | 0.4 | 5 |
| 3 | 0.5 | 0.5 | 5 |

The components of each mixture were combined and ground into a fine powder using a mortar and pestle. A panel of tasters found mixture No. 1 to be somewhat bitter and thus less than satisfactory. Mixture No. 2 was found to be very satisfactory with a predominantly salty taste having "meaty" undertones. Mixture 3 was also found to be very satisfactory producing a saltiness only slightly better than No. 2. Thus, on the basis of a gram of material, a 50-60% reduction in NaCl can be achieved without a significant diminution in the saltiness. In separate experiments cpc was shown to enhance the perceived saltiness of the mixture. Mixtures with reduced cpc levels, though salty, were judged to be inferior to the above described mixtures. L-arginine hydrochloride carries its own salty flavor which makes it desirable for use as an extender. It also is a natural product and is thus safe for internal consumption.

With reference to Example IX, it is contemplated that a binary mixture of a surfactant in accordance with the invention and either sodium chloride or a salty tasting substitute should be useful for potentiating the salty taste of the salt or salty tasting substitute whereby the quantity of the salt or salty tasting substitute needed to produce a desired salty taste in food to which it may thus be minimized. In further accordance with Example IX, on a per gram basis, the sodium chloride content may be reduced by about 60%. Moreover, L-arginine hydrochloride is a natural amino acid which is not only safe, but also wholesome.

EXAMPLE X

As a variation on the shakable mixtures described in Example IX, it was determined that a shakable quaternary mixture of NaCl, L-arginine hydrochloride, guanosine monophosphate and cpc was also highly satisfactory, even though the NaCl content of the mixture was less than one-third by weight. A one gram portion of such mixture was prepared to contain the following ingredients:

0.326 gm. NaCl
0.652 gm. Arg.HCl
0.0019 gm. cpc
0.0196 gm. guanosine monophosphate The components of the mixture were combined with mortar and pestle. A panel of tasters found that this mixture preserved the salty taste of pure NaCl without introducing bitterness. It proved to be quite satisfactory as a salt substitute when placed on raw vegetables such as carrots or celery.

What is claimed is:

1. A process for preparing an improved sodium chloride containing food or beverage comprising potentiating the sodium chloride taste in said sodium chloride containing food or beverage by adding thereto a sodium chloride taste potentiating amount of cetylpyridinium chloride.

2. A composition, enhanced in sodium chloride taste, and comprising a food or beverage containing sodium chloride and a sodium chloride taste potentiating amount of cetylpyridinium chloride.

3. A process for preparing a salty tasting food or beverage containing a reduced amount of sodium chloride comprising:
   formulating a food or beverage with a reduced amount of sodium chloride less than is necessary to achieved a desired salty taste in said food or beverage; and
   potentiating the sodium chloride taste in said reduced sodium chloride content food or beverage by adding thereto cetylpyridinium chloride in an amount sufficient to potentiate the salty taste of said salty food or beverage to reach said desired salt taste.

4. A process in accordance with claim 3, wherein said reduced sodium chloride content food or beverage further contains a compound selected from the group consisting of salty tasting cationic aminoacids and low molecular weight dipeptides.

5. A process in accordance with claim 4, wherein said salty tasting compound comprises a compound selected from the group consisting of arginine hydrochloride, lysine hydrochloride and lysine-ornithine hydrochloride.

6. A process in accordance with claim 4, wherein said salty tasting compound is present in an amount sufficient to produce a 1 to 40 mM concentration of said salty tasting compound in said food or beverage product.

7. A composition having an enhanced salty taste comprising sodium chloride or a food or beverage containing the same, a salty tasting compound selected from the group consisting of cationic aminoacids and low molecular weight peptides, and a salt taste potentiating amount of cetylpyridinium chloride.

8. A composition according to claim 7, wherein said salty tasting compound is selected from the group consisting of arginine hydrochloride, lysine hydrochloride and lysine-ornithine hydrochloride.

9. A particulate, solid composition having a salty taste equivalent to sodium chloride and comprising a mixture of sodium chloride, a salty tasting compound selected from the group consisting of cationic aminoacids and low molecular weight dipeptides, and a salt taste potentiating amount of cetylpyridinium chloride.

10. A composition as set forth in claim 9, wherein said mixture comprises less than 50 weight % sodium chloride.

11. A particulate, solid composition having a salty taste equivalent to sodium chloride and consisting essentially of a mixture of sodium chloride and a salt taste potentiating amount of cetylpyridinium chloride.

* * * * *

UNITED STATES PATENT AND TRADEMARK OFFICE
CERTIFICATE OF CORRECTION

PATENT NO. : 4,997,672

DATED : March 5, 1991

INVENTOR(S) : JOHN A. DeSIMONE and GERARD L. HECK

It is certified that error appears in the above-identified patent and that said Letters Patent is hereby corrected as shown below:

Column 2, line 17, "obrombenzyl" should be --o-bromobenzyl--.

Column 4, line 65, "not" should be --not--.

Column 13, line 1, "peptides" should be --dipeptides--.

Signed and Sealed this

Twenty-first Day of July, 1992

Attest:

DOUGLAS B. COMER

Attesting Officer

Acting Commissioner of Patents and Trademarks